June 19, 1928.  J. W. SILVER  1,673,889
MOLDING MACHINE
Filed April 14, 1927  3 Sheets-Sheet 1
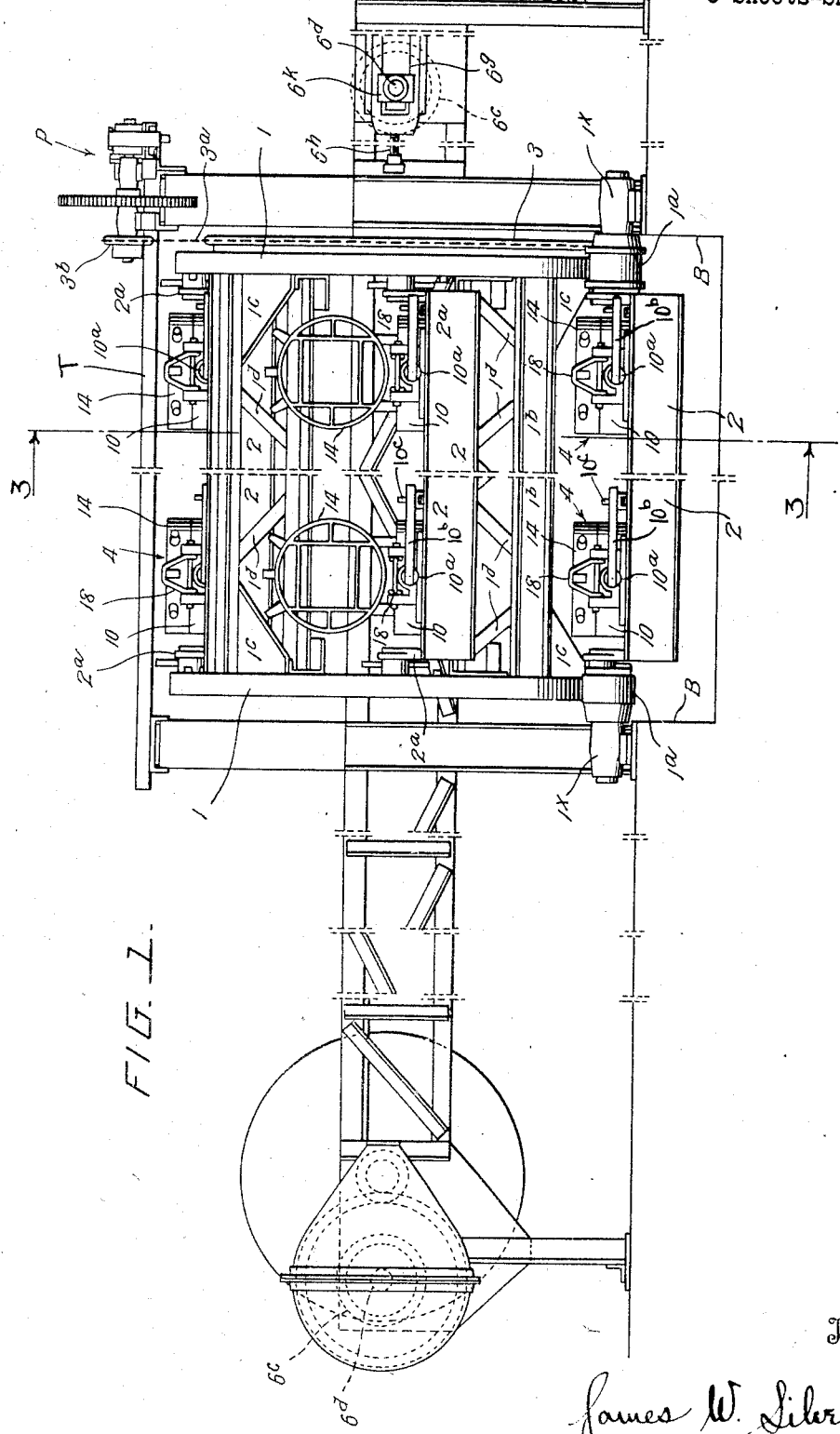
Inventor
James W. Silver
By Alexander T Powell
Attorneys

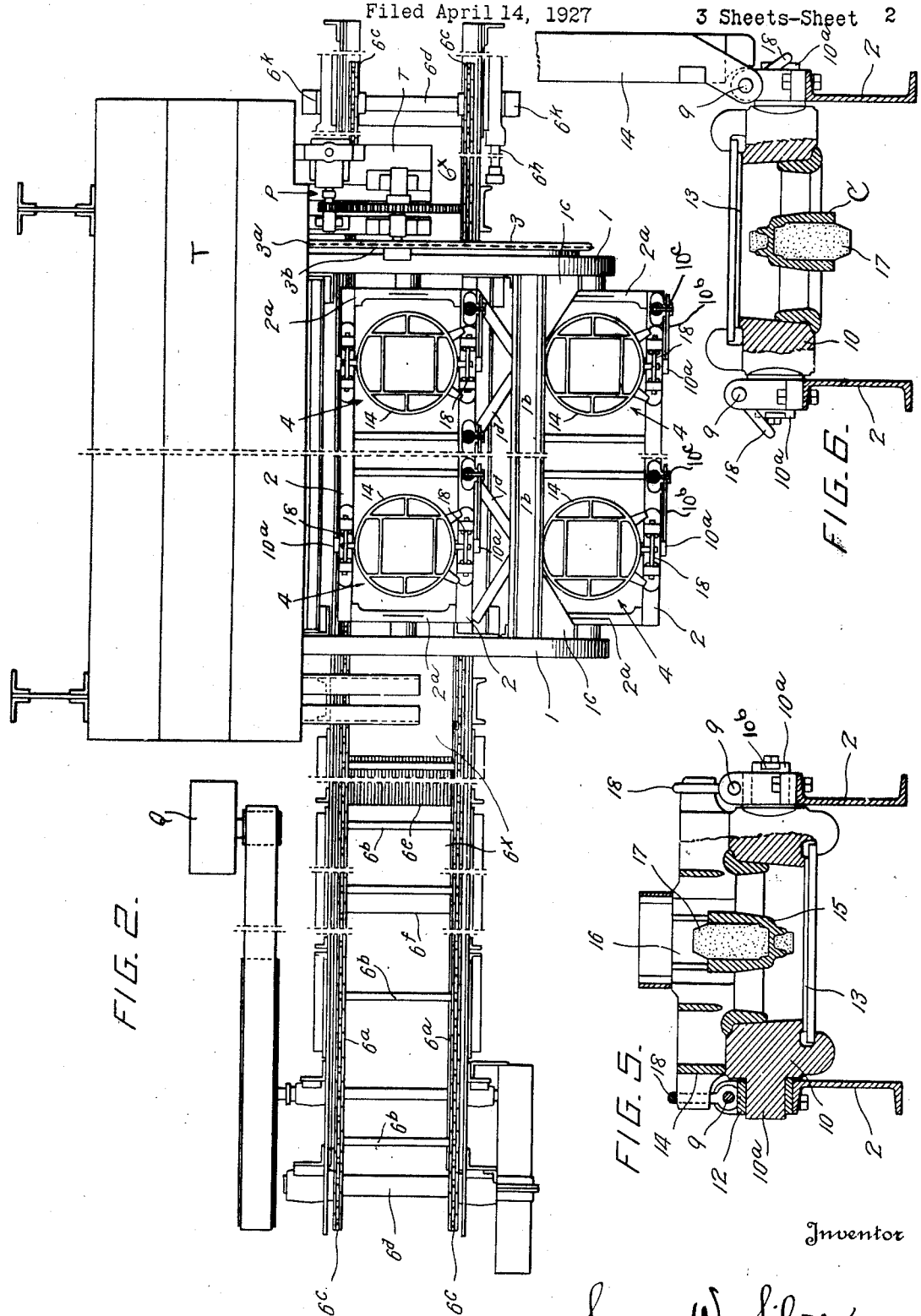

June 19, 1928. 1,673,889
J. W. SILVER
MOLDING MACHINE
Filed April 14, 1927 3 Sheets-Sheet 3
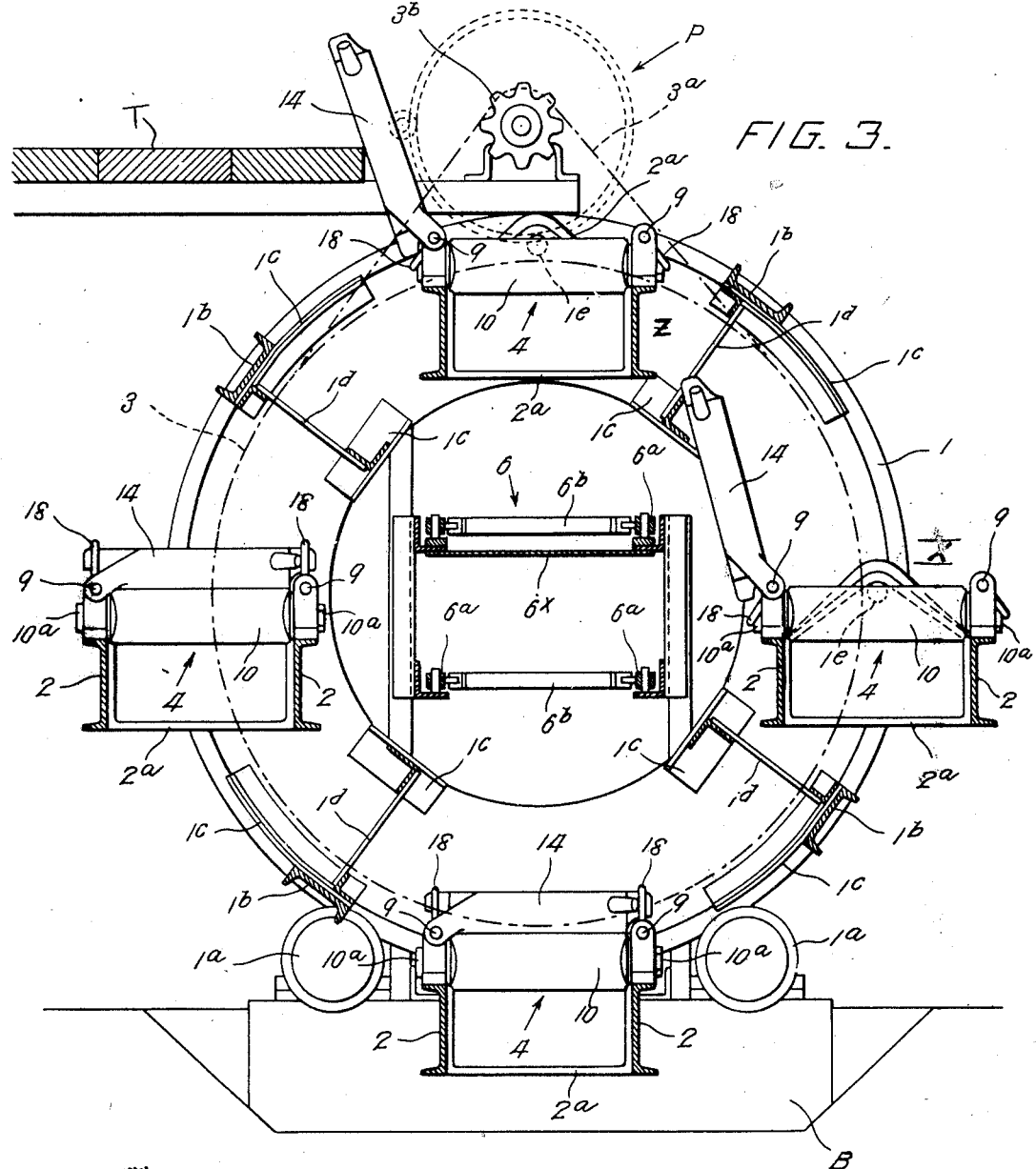
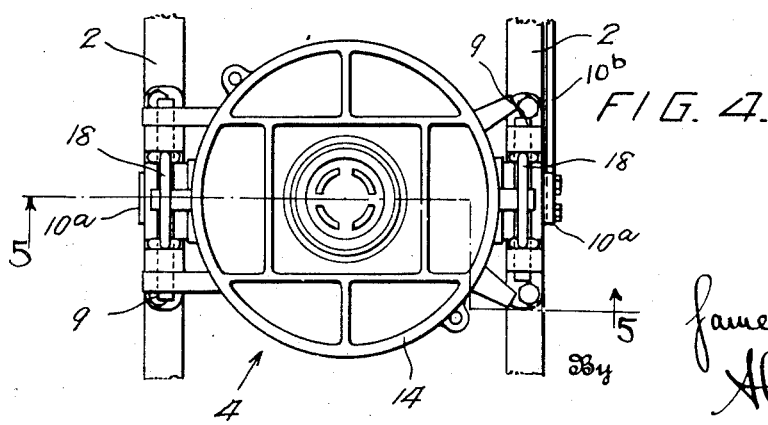
Inventor
James W. Silver
By Alexander T. Powell
Attorneys Patented June 19, 1928.

1,673,889

UNITED STATES PATENT OFFICE.

JAMES W. SILVER, OF OGDEN, UTAH.

MOLDING MACHINE.

Application filed April 14, 1927. Serial No. 183,852.

This invention is a novel improvement in molding machines, and the principal object of the invention is to provide a molding machine of novel arrangement and construction consisting of one or more horizontally rotatable batteries of cylindrical shape, arranged end to end, each battery carrying a plurality of swingable frames, each carrying a plurality of molding flasks whereby as the batteries rotate the swinging frames will likewise rotate in an orbit from the pouring positions of the flasks to the dumping positions thereof; with an endless conveyor disposed axially of the several batteries below the dumping positions of the molding flasks for receiving and carrying away the castings discharged or dumped from the flasks. My invention is particularly adapted for molding articles such as car wheel castings, but may of course be used for molding other articles. The feature of having the conveyor disposed axially of and extending through the batteries makes it possible to extend the one endless conveyor to receive the dumped castings of any desired number of batteries, thereby dispensing with unnecessary handling of the castings, and conserving floor space. The above arrangement also makes it possible to keep the molding flasks in position ready for molding at all times, whereas heretofore the practice has been to have the flasks and chills as separate units, and to use conveyors, hoists, or lifts for assembling and dismantling same in the molding and shaking out operation.

The feature of pouring the hot metal in my machine is also very important, for as soon as one tier of molds has been poured it is moved out of the way by revolving the battery and is replaced by another tier of molds ready for pouring. It is also desirable in handling hot castings to have them dumped without lifting same from the mold and to convey them to a distant point for cooling and cleaning as provided for in my machine.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction and novel combinations of parts for which protection is desired.

In said drawings:

Fig. 1 is a side elevation of the machine showing the battery and conveyor partly broken away.

Fig. 2 is a top plan view of the machine shown in Fig. 1.

Fig. 3 is an enlarged section on the line 3—3, Fig. 1.

Fig. 4 is an enlarged top plan view of the molding flask in pouring position.

Fig. 5 is a section on the line 5—5, Fig. 4.

Fig. 6 is detail section of the molding flask in dumping position.

As shown, my novel molding machine comprises one or more batteries arranged end to end in axial alignment each battery comprising a circular open frame consisting of two end trunnion rings 1 of relatively large diameter, adapted to revolve upon pairs of spaced rollers $1^a$, journaled in suitable bearings $1^x$ mounted on foundation blocks B at the base of the machine. Between each pair of trunnion rings 1 are longitudinal frame members $1^b$ preferably comprising channel bars substantially disposed tangent to the rings 1, and rigidly connected thereto by means of bracket plates $1^c$. Frames $1^b$ are preferably further stiffened by truss frames $1^d$ of angle irons or the like connected with the frame members $1^b$ within the periphery of rings 1. Frame members $1^b$ are preferably disposed 90 degrees apart, as shown more particularly in Fig. 3.

At one end of each battery and connected with the trunnion ring 1 is a sprocket wheel 3 of suitable diameter driven by means of a chain $3^a$ running around sprocket 3 and a sprocket wheel $3^b$ on the shaft of a suitable prime mover P, which is preferably a reversible air motor mounted above the machine upon a platform T, supported upon a suitable frame work, disposed at one side of the battery as shown in Figs. 2 and 3. The motor P however may be disposed in any other desired location.

Between the pairs of trunnion rings 1 in each battery, and alternating with frames $1^b$ are the swinging frames which support and carry a series of molding flasks. Preferably each swinging frame comprises parallel beams 2 of suitable structural shape, connected together at their ends by means of substantially triangular end plates $2^a$, the apex of the plates being disposed above the tops of beams 2 and on the axes of the swinging frames and being hinged on pins 1ᵉ disposed on rings 1 near the periphery of the rings, whereby each swinging frame will be pivotally supported between the trunnion rings 1, and as the battery rotates the swinging frames will remain by gravity in a horizontal position at all times. The swinging frames each carry a series of molding flasks 4, hereinafter described, which flasks are mounted in trunnions carried by the opposed beams 2.

Extending axially through the aligned batteries is an endless conveyor preferably of a drag type comprising two side chains 6ᵃ and cross bars 6ᵇ between the chains running over a table 6ˣ supported on a suitable frame work of angle irons, said conveyor extending entirely through the aligned batteries and to the desired point of discharge of the castings. Conveyor chains 6ᵃ preferably run around sprockets 6ᶜ mounted on shafts 6ᵈ at each end of the conveyor frame, one of said shafts 6ᵈ being driven through suitable belting or gearing from a prime mover Q. Disposed toward the head end of the conveyor is a screen 6ᵉ arranged in the bottom plate 6ˣ of the conveyor through which, as the castings are drawn over the screen, all sand will be discharged into a bin or other conveying apparatus; and between the head end of the conveyor and the screen 6ᵉ is an opening 6ᶠ in the bottom plate 6ˣ for the discharge therethrough of the castings into containers or other conveying apparatus, or same may be dropped on the ground and rolled into annealing pits. The conveyor is so arranged that the castings fall between the cross bars 6ᵇ on the return or under run of the conveyor chains 6ᵃ, the cross bars being so spaced that there will be no possibility of a falling casting striking a cross bar.

At the tail end of the conveyor I provide suitable take-up means for adjusting the tension of the conveyor chains 6ᵃ, said means comprising adjustable bearings 6ᵏ for the sprocket shaft 6ᵈ slidably mounted in slots 6ᵍ in the sides of the conveyor frame, with screws 6ʰ engaging the bearings 6ᵏ for moving the bearings in directions to diminish or increase the slack in the conveyor chains 6ᵃ. Any other desired take-up means however may be used in the place of the one above described.

The individual molding flasks generally indicated at 4 in Figs. 1, 2, and 3 may be of any type suitable for dumping. The type shown however in detail in Figs. 4, 5, 6 is adapted for molding car wheels and comprises a chill 10 with trunnions 10ᵃ journaled in bearings 12 mounted upon the opposed beams 2, and a cope 14 arranged to hinge on a pin 9. In operation cope 14 is hinged back, and a pattern 15 is placed and held in position in chill 10, which is then rotated 180 degrees on trunnions 10ᵃ and rammed with sand. Plate 13 is then placed and locked in position, and chill 10 again rotated 180 degrees. All pattern holding apparatus is then removed except the pattern 15 which remains in position, and core 16 is placed, and cope 14 is then hinged down into position and rammed with sand. Cope 14 is then hinged upwardly again, pattern 15 is withdrawn, core 17 then placed, and cope 14 again hinged down into position and held with clamps 18. The flask is then ready for pouring. When the casting has been poured, clamps 18 are released, as shown in Fig. 6, and cope 14 is thrown back, chill 10 is rotated 180 degrees and the casting C is dumped upon the endless conveyor.

The chills 10 are operated by levers 10ᵇ secured in any desired manner to the front trunnions 10ᵃ of the chills which levers are adapted to be engaged with catches 10ᶜ mounted on the beams 2 to lock the flasks 4 against rotation in their frames.

When the flasks 4 in each swinging frame 2 are being prepared they are held in position X, Fig. 3, and the battery is rotated until each of the other flask carrying frames come into position X. When all flasks in each battery have been prepared for pouring the flasks in position X will be ready for pouring, and the flasks are poured in the same order as they were prepared for pouring. As the poured molds reach position Z, Fig. 3, at the top of the battery their contents are dumped on to the conveyor 6, and the castings C are dragged over screen 6ᵉ and to the discharge opening 6ᶠ of the conveyor.

My arrangement is simple and efficient and dispenses with a great deal of unnecessary handling of the castings, chills, molds, etc., and I do not consider my invention limited to the exact details shown in the drawings for obviously changes may be made therein within the scope of the claims.

I claim:

1. In a molding machine, frames carrying the molding flasks adapted to rotate on their horizontal axes; means for rotating said frames; and a conveyor extending axially through the frames, for the purpose specified.

2. In a molding machine, horizontally disposed circular frames carrying the molding flasks adapted to rotate on their horizontal axes; means for rotating said frames; and an endless conveyor extending through the frames, for the purpose specified.

3. In a molding machine, horizontally disposed circular frames arranged end to end and carrying the molding flasks and having end trunnion rings supported on rollers and adapted to rotate on their horizontal axes; means for rotating said frames; and an endless conveyor extending through the frames, for the purpose specified.

4. In a molding machine, a frame adapted to rotate on its horizontal axis; means for rotating said frame; flask carrying supports pivotally mounted on the frame and extending parallel with the axis thereof; molding flasks mounted on each support; and a conveyor extending through the frame for the purpose specified.

5. In a machine as set forth in claim 4, said frame comprising a pair of spaced trunnion rings adapted to rotate upon rollers; and spaced frame members connecting the said rings; the said flask supports alternating with the said frame members.

6. In a machine as set forth in claim 4, each flask support comprising spaced parallel beams adapted to support a series of molding flasks and connected together at each end, each end having portions extending above the tops of the beams, and a pin connecting each end above the center of gravity of the support to the frame, whereby as the frame rotates the support during its orbit will be maintained by gravity in horizontal position.

7. In a machine as set forth in claim 4, each molding flask comprising a chill rotatably mounted in trunnions on said support; a cope hingedly mounted on said support above the chill; and means for locking the chill against rotation during the pouring operation, said means permitting the chill to be rotated for dumping.

8. In a machine as set forth in claim 4, said endless conveyor comprising a bottom plate supported on a frame; sprockets at each end of the conveyor frame; endless chains running over the sprockets; cross bars extending between the chains; means for rotating said sprockets; and a sand screen in the bottom plate adjacent the head end of the conveyor.

9. In a molding machine, a plurality of frames arranged end to end and adapted to rotate on their horizontal axes; means for individually rotating each frame; flask carrying supports pivotally mounted on each frame and extending parallel with the axis thereof; a series of molding flasks mounted on each support; and an endless conveyor extending through all the frames, for the purpose specified.

10. In a machine as set forth in claim 9, each frame comprising a pair of spaced trunnion rings adapted to rotate upon rollers; and spaced frame members connecting each pair of rings; the said flask supports alternating with the said frame members.

11. In a machine as set forth in claim 9, each flask carrying support comprising a pair of spaced parallel beams adapted to support a series of molding flasks; plates connecting the ends of the beams and having portions extending above the tops of the beams, and a pin connecting the upper end of each plate at its center to the frame, whereby as the frame rotates the support will be maintained by gravity in horizontal position throughout its orbit.

12. In a machine as set forth in claim 9, each molding flask comprising a chill rotatably mounted in trunnions on said support; a cope hingedly mounted on said support above the chill; and means for holding the chill against rotation during the pouring operation, said means permitting the chill to be rotated for dumping.

13. In a machine as set forth in claim 9, said endless conveyor comprising a bottom plate supported on a frame; sprockets mounted at each end of the conveyor frame; endless chains running over the sprockets; cross bars extending between the chains; means for rotating said sprockets; and a sand screen in the bottom plate adjacent the head end of the conveyor.

14. In a molding machine, horizontally disposed cylindrical frames arranged end to end and adapted to rotate on their horizontal axes; each frame comprising a pair of trunnion rings adapted to rotate on rollers; spaced frame members connecting said rings; means for individually rotating said frames; a plurality of flask carrying supports on each frame extending parallel with the axis thereof; series of molding flasks mounted on said supports; and an endless conveyor extending axially through the frames for the purpose specified.

15. In a machine as set forth in claim 14, each flask carrying support comprising a pair of spaced parallel beams adapted to support a series of molding flasks; plates connecting the ends of the beams and having portions extending above the tops of the beams, and a pin connecting the upper end of each plate at its center to the frame, whereby as the frame rotates the support will be maintained by gravity in horizontal position throughout its orbit.

16. In a machine as set forth in claim 14, each molding flask comprising a chill rotatably mounted in trunnions on said support; a cope hingedly mounted on said support above the chill; and means for holding the chill against rotation during the pouring operation, said means permitting the chill to be rotated for dumping.

17. In a machine as set forth in claim 14, said endless conveyor comprising a bottom plate supported on a frame extending through the battery; sprockets mounted at each end of the conveyor frame; endless chains running over the sprockets; cross bars extending between the chains; means for adjusting the tension of said chains; means for rotating said sprockets; and a sand screen in the bottom plate adjacent the head end of the conveyor.

18. In a molding machine, a plurality of horizontally disposed cylindrical frames arranged end to end and adapted to rotate on their horizontal axes; means for individually rotating said frames; a plurality of flask carrying supports extending parallel with the axes of said frames; each support comprising a pair of spaced parallel beams; plates connecting the ends of the beams and having portions extending above the tops of the beams; pins connecting the upper ends of the plates at the centers thereof to the frames, whereby as the frames rotate the supports will be maintained by gravity in a horizontal position; series of molding flasks mounted on said supports; and an endless conveyor extending axially through the frames for the purpose specified.

19. In a machine as set forth in claim 18, each frame comprising a pair of spaced trunnion rings adapted to rotate upon rollers; and spaced frame members connecting each pair of rings; the said flask supports alternating with the said frame members.

20. In a machine as set forth in claim 18, each molding flask comprising a chill rotatably mounted in trunnions on said support; a cope hingedly mounted on said support above the chill; and means for holding the chill against rotation during the pouring operation, said means permitting the chill to be rotated for dumping.

21. In a machine as set forth in claim 18, said endless conveyor comprising a bottom plate supported on a frame extending through the battery; sprockets mounted at each end of the conveyor frame; endless chains running over the sprockets; cross bars extending between the chains; means for adjusting the tension of said chains; means for rotating said sprockets; and a sand screen in the bottom plate adjacent the head end of the conveyor.

22. In a molding machine, a plurality of horizontally disposed cylindrical frames arranged end to end and adapted to rotate on their horizontal axes; each frame comprising a pair of trunnion rings adapted to rotate on rollers; spaced frame members connecting said rings; means for individually rotating said frames; a plurality of flask carrying supports extending parallel with the axes of said frames; each supporting member comprising a pair of spaced parallel beams; plates connecting the ends of the beams, and having portions extending above the tops of the beams; pins connecting the upper ends of the plates at the centers thereof to the trunnion rings adjacent their outer ends whereby the supports will be gravitally maintained in horizontal position as the frames rotate; series of molding flasks mounted on said supports; and an endless conveyor extending axially through the frames for the purpose specified.

23. In a machine as set forth in claim 22, each molding flask comprising a chill rotatably mounted in trunnions on said support; a cope hingedly mounted on said support above the chill; and means for holding the chill against rotation during the pouring operation, said means permitting the chill to be rotated for dumping.

24. In a machine as set forth in claim 22, said endless conveyor comprising a bottom plate supported on a frame extending through the battery; sprockets mounted at each end of the conveyor frame; endless chains running over the sprockets; cross bars extending between the chains; means for adjusting the tension of said chains; means for rotating the sprockets; and a sand screen in the bottom plate adjacent the head end of the conveyor; said bottom plate having an opening therein at the head end for the discharge of articles therethrough.

25. In a molding machine, a horizontally disposed rotatable frame comprising a pair of trunnion rings adapted to rotate upon rollers; spaced frame members connecting the said rings; pairs of spaced parallel beams extending parallel with and alternating with the frame members; plates connecting the ends of the parallel beams and having portions extending above the tops of the beams; pins connecting the upper ends of each plate to the trunnion rings, whereby as the frame rotates the supports will be maintained by gravity in horizontal position; and series of molding flasks mounted in trunnions on said parallel beams.

In testimony that I claim the foregoing as my own, I affix my signature.

JAMES W. SILVER.